(12) United States Patent
Bordelon et al.

(10) Patent No.: US 10,270,759 B1
(45) Date of Patent: Apr. 23, 2019

(54) FINE GRAINED CONTAINER SECURITY

(71) Applicant: Mesosphere, Inc., San Francisco, CA (US)

(72) Inventors: Adam Bordelon, San Francisco, CA (US); Jan Philip Gehrcke, Hamburg (DE); Albertus Strasheim, San Francisco, CA (US)

(73) Assignee: Mesosphere, Inc., San Francisco, CA (US)

( * ) Notice: Subject to any disclaimer, the term of this patent is extended or adjusted under 35 U.S.C. 154(b) by 138 days.

(21) Appl. No.: 15/628,843

(22) Filed: Jun. 21, 2017

(51) Int. Cl.
| *H04L 29/06* | (2006.01) |
| *G06F 21/44* | (2013.01) |
| *G06F 9/48*  | (2006.01) |

(52) U.S. Cl.
CPC .......... *H04L 63/083* (2013.01); *G06F 9/4843* (2013.01); *G06F 21/44* (2013.01); *G06F 2209/482* (2013.01)

(58) Field of Classification Search
CPC .................................................... H04L 63/083
USPC ............................................................. 726/7
See application file for complete search history.

(56) References Cited

U.S. PATENT DOCUMENTS

| 9,668,136 | B2 * | 5/2017 | Mistry .................. H04L 63/083 |
| 2010/0192193 | A1 * | 7/2010 | Olson ................. G06F 21/6218 726/1 |
| 2016/0248640 | A1 * | 8/2016 | Simoncelli .......... H04L 41/5054 |

* cited by examiner

*Primary Examiner* — Longbit Chai
(74) *Attorney, Agent, or Firm* — Van Pelt, Yi & James LLP

(57) ABSTRACT

A system for a containerized application includes an interface and a processor. The interface is configured to receive an indication from a user to create a containerized application. The indication comprises a first user authentication information (e.g., an authentication token issued by an authentication server) and an application permission information. The processor is configured to determine whether the first user authentication information indicates that the user has permission to create a definition for the containerized application with the application permission information, and, if so, create the definition for the containerized application with the application permission information. The processor is configured to determine whether a second user authentication information indicates that the user has permission to execute the containerized application using the definition for the containerized application, and, if so, indicate to process a job using the containerized application.

24 Claims, 12 Drawing Sheets

FINE GRAINED CONTAINER SECURITY

BACKGROUND OF THE INVENTION

Data centers process multiple jobs associated with multiple tenants. The multiple jobs can be processed using different types of systems: separate machines, separate virtual machines, or separate containers running on a separate machine or a separate virtual machine. Each of the types of systems have advantages and disadvantages. For example, containers offer the fastest setup capability compared to separate machines or separate virtual machines. However, processing jobs within containers offers less strong isolation than separating jobs into different physical or virtual machines. This poses a security problem for using containers for processing especially for data from different tenants.

BRIEF DESCRIPTION OF THE DRAWINGS

Various embodiments of the invention are disclosed in the following detailed description and the accompanying drawings.

DETAILED DESCRIPTION

Figure 1:
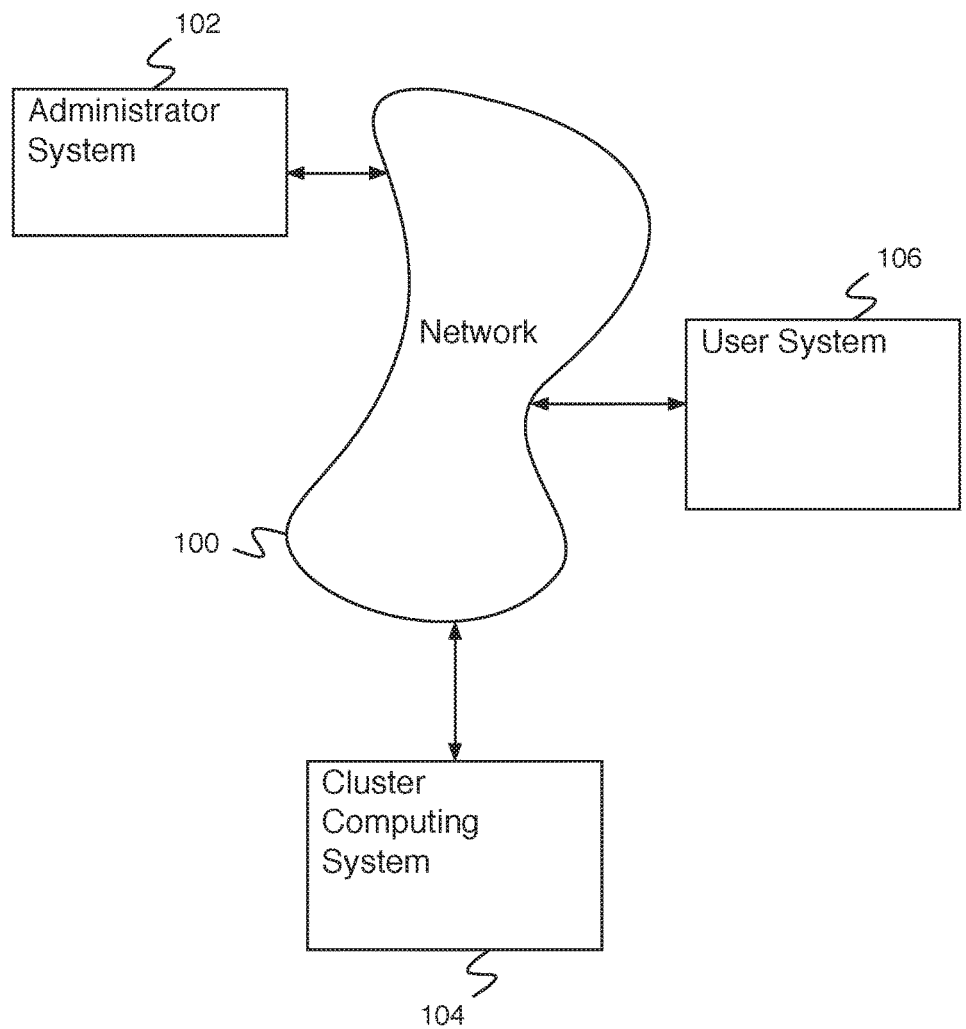
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for fine-grained container security is disclosed. The system includes an interface and a processor. The interface is configured to receive an indication from a user to create a containerized application, wherein the indication comprises a first user authentication information and an application permission information, wherein the first user authentication information comprises an authentication token issued by an authentication server. The processor is configured to determine whether the first user authentication information indicates that the user has permission to create the containerized application with the application permission information, and in the event that the first user authentication information indicates the user has permission to execute the containerized application with the application permission information, create the containerized application with the application permission information, and determine whether a second user authentication information indicates that the user has permission to execute the containerized application, wherein determining whether the second user authentication information indicates that the user has permission to execute the containerized application is based at least in part on the application permission information associated with the containerized application, and in the event the second user authentication information indicates that the user has permission to execute the containerized application, indicate to process the job using the containerized application. In some embodiments, the system for a containerized application comprises a memory coupled to the processor and configured to provide the processor with instructions.

In some embodiments, a system for fine grained container security comprises a cluster system for executing containerized jobs. To ensure security between jobs performed within containers, a fine grained security system enables fine grained control over data access and process execution within containers. The cluster system comprises a cluster master system and a plurality of cluster worker systems. The cluster system comprises a proxy system (e.g., an nginx proxy) for providing an initial authentication/authorization and request routing. After a request has been authenticated by the proxy interface it is routed to a cluster location determined by the request (e.g., a particular worker machine, a particular system of the cluster master, etc.). When a user initially logs into the cluster system, an identity and access management system (IAM also known as authN and authZ) of the cluster master system authenticates the user login and provides the user an authentication token (e.g., a cryptographic authentication token) for authenticating further user requests. Further user requests (e.g., create a new containerized job, execute a containerized job, query the status of a job, change a user permissions, etc.) are provided with the authentication token. A user request with an authentication token is forwarded to the appropriate system by the administration router, and the identity access management system provides permission information associated with the user to the system. In some embodiments, the permission information is additionally associated with the request type. The system compares the user request with the permission information to determine whether the user is allowed to execute the request, and in the event the permission information indicates that the user is allowed to execute the request, the system performs the user request. In some embodiments, the user requests the creation of an application using the authentication, and in the event that the user has permission to create the application, the application is created and stored along with storing the associated permissions.

In some embodiments, the system for fine grained security comprises a cluster system for executing Windows™ container jobs or virtual machine jobs.

In some embodiments, the description herein can be applied to a task. In various embodiments, a task or a job applies to something that runs in a container, something that is made up of multiple parts that execute in parallel or in series or in sequence, or any other appropriate execution unit. In some embodiments, fine grained access control is used for the processes of creation, reading, updating, deleting of tasks, jobs, or any other appropriate processing unit.

In various embodiments, the permissions and access control is used for the processes of viewing, accessing, creation, running, completing, reading, updating, and deleting of the application or the definition of the application or any other appropriate action regarding the application. For example, the system uses the same mechanisms to control (e.g., permissions and access control) which users can view/access the running/completed tasks from an application, including their metadata and logs. In addition, the system uses the same mechanisms to control destroying the application or updating it.

In some embodiments, permission information comprises a directory path or set of directory paths within which the user is allowed to perform a request. The path or set of paths is additionally dependent on the request type (e.g., a different path or set of paths is stored for different request types). Comparing the user request with the permission information comprises determining whether the user request comprises a subpath of the path or set of paths indicated by the permission information. For example, permission information indicates that userA has permission to execute containerized applications stored within/prod/userA. Any request made by userA to execute applications within/prod/userA or a subdirectory (e.g., /prod/userA/tmp, /prod/userA/foo/bar, etc.) will be allowed, any request made by userA to execute other applications will not be allowed.

In some embodiments, a user requests to process a job and the job is executed (having been created by a user with the proper credentials and having been requested to be executed by a user with the proper credentials).

In some embodiments, a user requests to view a task and the metadata is returned to the user after the user is verified to see if the user has permission to access stored task data associated with a location and/or associated with a process.

In some embodiments, the fine grained control of process creation and execution and storage access enables the system to perform more securely than a system without this control in that processes and storage access are controlled so that a user is not able to execute processes or access stored data and/or processes that are not permitted.

In various embodiments, authentication server or access manager comprises one or more servers or systems. For example, an authentication server or access manager that stores/checks the user permissions (e.g., an authZ system) is one system and an authentication server or access manager that manages identity by verifying identities (e.g., authN) is another system. Or in another example, an authentication server or access manager that stores/checks the user permissions (e.g., an authZ system) is the same system as an authentication server or access manager that manages identity by verifying identities (e.g., authN).

FIG. 1 is a block diagram illustrating an embodiment of a network system. In some embodiments, the network system of FIG. 1 comprises a system for executing a job. In the example shown, an interface of cluster system 104 is configured to receive an indication from a user using user system 106 to create a containerized application to run in cluster system 104, wherein the indication comprises a first user authentication information and an application permission information, wherein the first user authentication information comprises an authentication token issued by an authentication server (e.g., an access manager of cluster system 104). A processor of cluster system 104 is configured to determine whether the first user authentication information indicates that the user has permission to create the containerized application with the application permission information (e.g., create and then store within cluster system 104 in a storage unit of cluster system 104), and in the event that the first user authentication information indicates the user has permission to execute the containerized application with the application permission information, create the containerized application with the application permission information, and determine whether a second user authentication information indicates that the user has permission to execute the containerized application, wherein determining whether the second user authentication information indicates that the user has permission to execute the containerized application is based at least in part on the application permission information associated with the containerized application, and in the event the second user authentication information indicates that the user has permission to execute the containerized application, indicate to process the job using the containerized application. In some embodiments, the system for a containerized application comprises a memory coupled to the processor and configured to provide the processor with instructions.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, and user system 106 communicate via network 100. In the example shown, administrator system 102 comprises an administrator system for use by an administrator. In various embodiments, administrator system 102 comprises an administrator system for executing administrator commands, for executing jobs using cluster computing system 104, for creating jobs using cluster computing system 104, for querying the status of jobs on cluster computing system 104, or for any other appropriate administrator system purpose. Cluster computing system 104 comprises a cluster computing system for executing cluster computing jobs. In some embodiments, cluster computing system 104 comprises a cluster computing system for executing a job in a container. In some embodiments, cluster computing system 104 comprises a cluster computing system comprising a fine grained security system. In some embodiments, cluster computing system 104 comprises a cluster computing system for determining whether to perform a user request based on a fine grained security policy. In various embodiments, cluster computing system 104 comprises a computer, a multiprocessor computer, a plurality of computers, a plurality of multiprocessor computers, or any other appropriate cluster computing system. In some embodiments, cluster computing system 104 comprises a plurality of individual cluster systems. User system 106 comprises a user system for use by a cluster computing system user. A cluster computing system user requests jobs on cluster computing system 104 via user system 106. In some embodiments, a plurality of user request jobs via a plurality of user systems to be executed by one or more cluster computing systems. In various embodiments, individual users are assigned individual cluster systems, individual users are assigned individual computers within a cluster system, individual users share computers within a cluster system, or users are divided among cluster systems in any other appropriate way.

Figure 2:
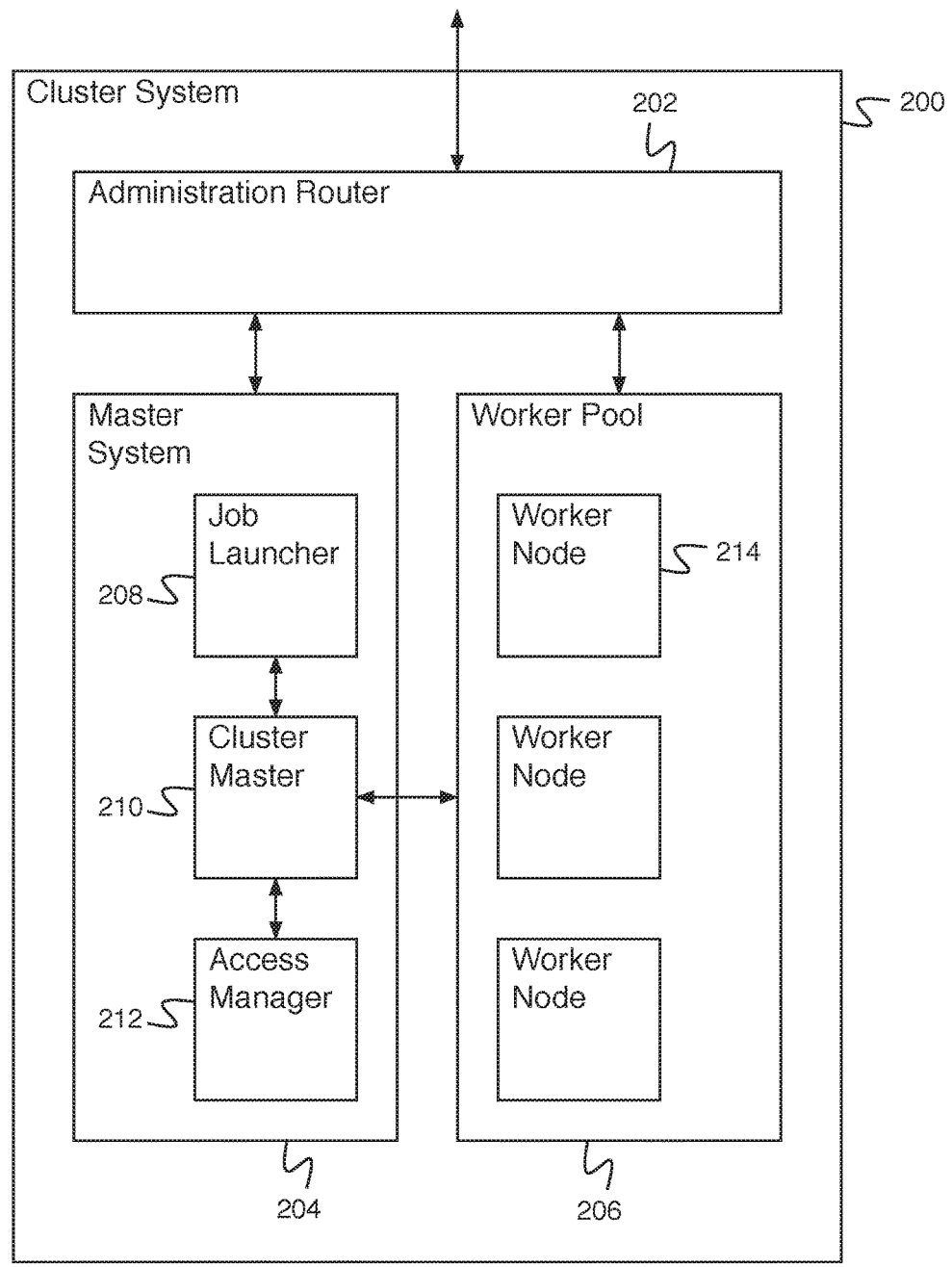
FIG. 2 is a block diagram illustrating an embodiment of a cluster system.

FIG. 2 is a block diagram illustrating an embodiment of a cluster system. In some embodiments, cluster system 200 comprises cluster system 104 of FIG. 1. In the example shown, cluster system 200 comprises administration router 202, master system 204, and worker pool 206. Connections to cluster system 200 are first authenticated by administration router 202. Administration router 202 authenticates a connection using an authentication token. In the event a user attempts to make a connection without an appropriate authentication token, the user is forwarded to access manager 212 to log in. In the event a user attempts to make a connection including an appropriate authentication token, the user permissions are determined, and in the event the user has permission to connect to the desired system, the administration router forwards the user to the desired system. Master system 204 comprises a system for assigning jobs, comprising job launcher 208, cluster master 210, and access manager 212. Access manager 212 is configured to receive an indication from a user using a user system to create a containerized application to run on a worker node (e.g., worker node 214) of the worker pool 206 in cluster system 200, wherein the indication comprises a first user authentication information and an application permission information, wherein the first user authentication information comprises an authentication token issued by an authentication server (e.g., an access manager 212 of cluster system 200). A processor of access manager 212 is configured to determine whether the first user authentication information indicates that the user has permission to create the containerized application with the application permission information (e.g., create and then store within cluster system 200 in a storage unit of cluster master 210 or a worker node of worker pool 206), and in the event that the first user authentication information indicates the user has permission to execute the containerized application with the application permission information, create the containerized application with the application permission information, and determine whether a second user authentication information indicates that the user has permission to execute the containerized application, wherein determining whether the second user authentication information indicates that the user has permission to execute the containerized application is based at least in part on the application permission information associated with the containerized application, and in the event the second user authentication information indicates that the user has permission to execute the containerized application, indicate to process the job using the containerized application.

In some embodiments, each of job launcher 208, cluster master 210, and access manager 212 are implemented using separate computer systems. In some embodiments, job launcher 208, cluster master 210, and access manager 212 are implemented using a single computer system. Cluster master 210 comprises a system for coordinating jobs using worker nodes (e.g., worker node 214) of worker pool 206. In various embodiments, cluster master 210 comprises a system for coordinating a parallel processing job among a set of worker nodes, a system for receiving an indication of available resources from a worker node and forwarding the indication of available resources to a job launcher system (e.g., job launcher 208), a system for receiving a job request from a job launcher system and providing the request to a worker node, or a cluster master system for any other appropriate purpose. In some embodiments, worker nodes of worker pool 206 (e.g., worker node 214) comprise worker nodes for executing jobs in containers. Job launcher 208 comprises a job launcher for launching jobs on worker nodes. In some embodiments, job launcher 208 comprises one of a plurality of job launchers (e.g., a plurality of job launchers, each job launcher of the plurality associated with a different type of tasks). Job launcher 208 receives job requests from users and determines required job resources and priority for the job requests. Job launcher 208 additionally receives indications of available resources from cluster manager 210 and provides job requests to execute using the available resources. In some embodiments, job launcher 208 provides requests for jobs to be executed in containers. Access manager 212 comprises an identity and access manager for managing authentication tokens and permissions. In some embodiments, access manager 212 comprises an identity and access manager (e.g., an IAM). A user without an associated authentication token is directed to access manager 212 to provide login information. In various embodiments, login information comprises a username and password, single sign on information, LDAP (e.g., lightweight directory access protocol) information, public key infrastructure (PKI) information, or any other appropriate login information. Access manager 212 verifies the login information and determines the user identity and provides an authentication token associated with the user identity to the user. In some embodiments, the authentication token comprises a cryptographic authentication token. Access manager 212 additionally comprises a set of permissions associated with each user. When a user makes a connection request to another system (e.g., administration router 202, cluster master 210, job launcher 208, a worker node e.g., worker node 214) comprising an authentication token, the system provides the token to access manager 212 and receives a set of permissions associated with the user in response. In some embodiments, the permissions are accessed using a user ID without the need for the token. The system can then use the set of permissions to determine whether the user has permission to execute the request. In some embodiments, determining whether a user has permission to execute a request comprises determining whether a path associated with the request comprises a subpath of a path associated with the set of permissions.

Figure 3:
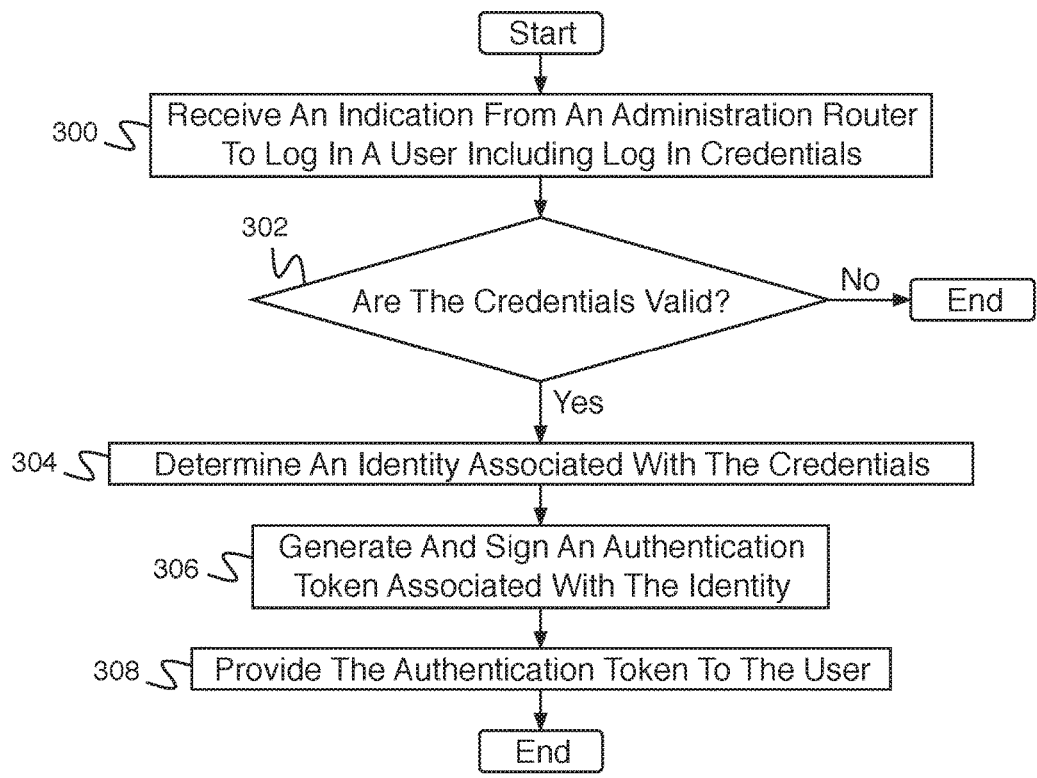
FIG. 3 is a flow diagram illustrating an embodiment of a process for logging in a user.

FIG. 3 is a flow diagram illustrating an embodiment of a process for logging in a user. In some embodiments, the process of FIG. 3 is executed by access manager 212 of FIG. 2. In the example shown, in 300, an indication is received from an administration router to log in a user including log in credentials. In various embodiments, log in credentials comprise a user name and password, single sign on information, LDAP information, PKI information, or any other appropriate log in credentials. In 302, it is determined whether the credentials are valid. In the event it is determined that the credentials are not valid, the process ends. In the event it is determined that the credentials are valid, control passes to 304. In 304, an identity is determined associated with the credentials. In some embodiments, an identity comprises a username. In 306, an authentication token associated with the identity is generated and signed. In some embodiments, the authentication token comprises a cryptographic authentication token. In some embodiments, signing the authentication token comprises adding information to the authentication token identifying the authentication token creator. In 308, the authentication token is provided to the user.

Figure 4:
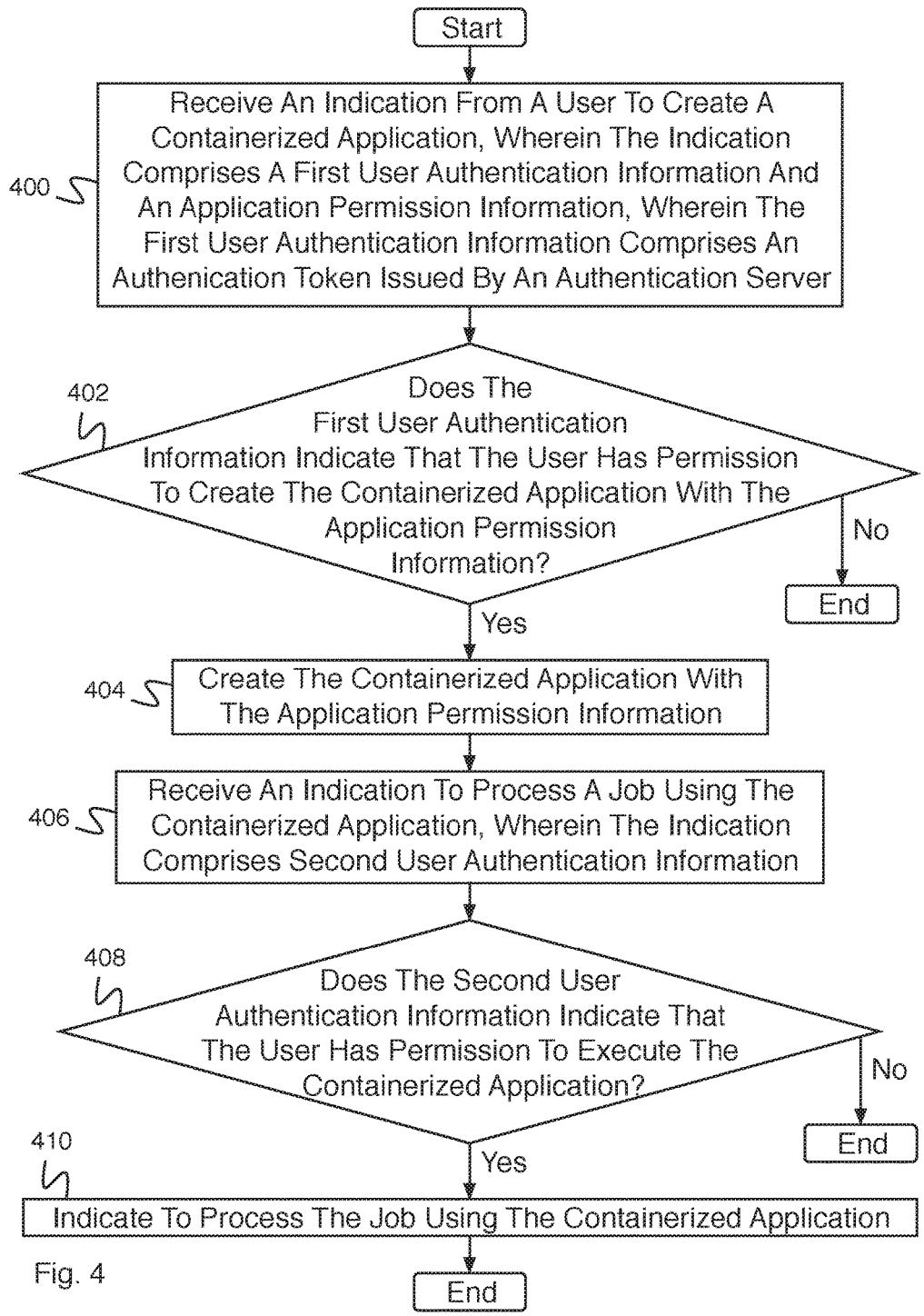
FIG. 4 is a flow diagram illustrating an embodiment of a process for a containerized application.

FIG. 4 is a flow diagram illustrating an embodiment of a process for a containerized application. In some embodiments, the process of FIG. 4 is executed by master system 204 of FIG. 2 or job launcher 208 of FIG. 2. In the example shown, in 400, an indication is received from a user to create a containerized application, wherein the indication comprises a first user authentication information and an application permission information, wherein the first user authentication information comprises an authentication token issued by an authentication server. In 402, it is determined whether the first user authentication information indicates that the user has permission to create a definition for the containerized application with the application permission information. In some embodiments, determining permission comprises querying using authentication information. In various embodiments, authentication information comprises username, identifier, password, credentials, or any combination thereof or any other appropriate information. In some embodiments, once the identity (e.g. username) is verified, the full "authentication information" (including password, credentials) is not needed to retrieve that user's permissions—only partial authentication information is needed; the (already authenticated) username/id is sufficient. In the event it is determined that the first user authentication information does not indicate that the user has permission to create a definition for the containerized application with the application permission information, the process ends. In the event it is determined that the first user authentication information indicates that the user has permission to create a definition for the containerized application with the application permission information, control passes to 404. In 404, a definition for the containerized application is created with the application permission information. For example, a definition for the application is created and stored including storing associated permissions, where eventually the stored definition is transferred to a container and is then used to execute the application.

In 406, an indication to process a job using the containerized application is received, wherein the indication comprises second user authentication information. For example, at a later time a user requests that the application is executed in order to process a job. In 408, it is determined whether the second user authentication information indicates that the user has permission to execute the containerized application using the definition for the containerized application. In the event it is determined that the second user authentication information does not indicate that the user has permission to execute the containerized application using the definition for the containerized application, the process ends. In the event it is determined that the second user authentication information indicates that the user has permission to execute the containerized application using the definition for the containerized application, control passes to 410. In 410, it is indicated to process the job using the containerized application. In various embodiments, a scheduler processes a job based on its determination or knowledge of whether or not resources are available, need to be waited on, need to be freed up, or any other appropriate scheduling of the processing of a job.

Figure 5:
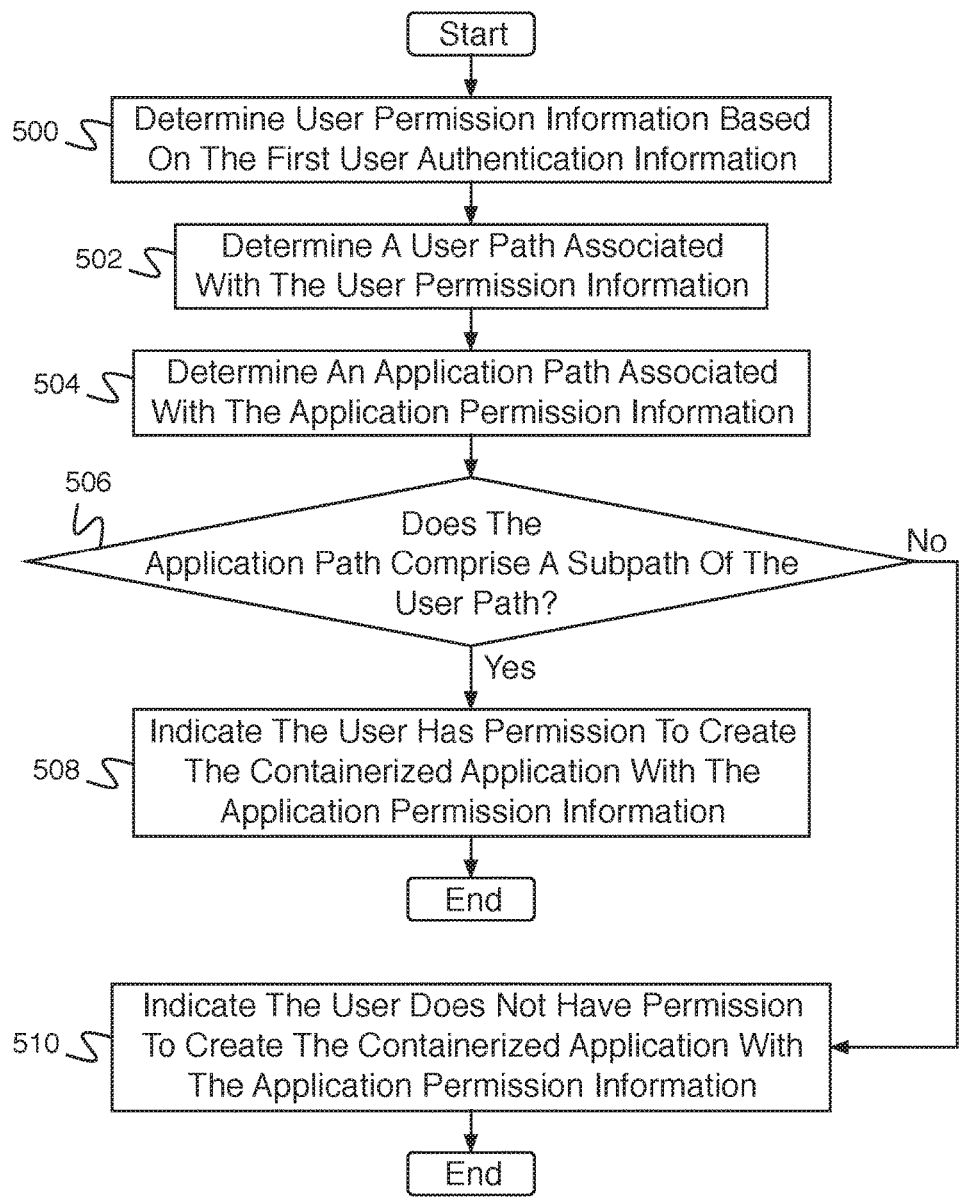
FIG. 5 is a flow diagram illustrating an embodiment of a process for determining whether first user authentication information indicates that a user has permission to create a containerized application with application permission information.

FIG. 5 is a flow diagram illustrating an embodiment of a process for determining whether first user authentication information indicates that a user has permission to create a containerized application with application permission information. In some embodiments, the process of FIG. 5 implements 402 of FIG. 4. In the example shown, in 500, user permission information based on the first user authentication information is determined. In some embodiments, the first user authentication information comprises an authentication token. In some embodiments, the authentication token comprises an authentication token issued by an authentication server (e.g., access manager 212 of FIG. 2). In some embodiments, an authentication token comprises a cryptographic authentication token. In some embodiments, determining user permission information based on the first user authentication information comprises querying an access manager (e.g., access manager 212 of FIG. 2). In 502, a user path associated with the user permission information is determined. In some embodiments the user permission information comprises the user path. In some embodiments, the user path is determined based at least in part on the user permission information. In some embodiments, the user permission information comprises a first user directory path in which the user is allowed to create a containerized application. In 504, an application path associated with the application permission information is determined. In some embodiments, the application path comprises the path in which the application is to be created. In 506, it is determined whether the application path comprises a subpath of the user path. In some embodiments, a subpath comprises a subdirectory. In some embodiments, the application path is considered to be a subpath of the user path in the event that the application path and the user path comprise the same path. In the event it is determined that the application path comprises a subpath of the user path, control passes to 508. In 508, the process indicates that the user has permission to create the containerized application with the application permission information, and the process ends. In the event it is determined in 506 that the application path does not comprise a subpath of the user path, control passes to 510. In 510, the process indicates that the user does not have permission to create the containerized application with the application permission information.

Figure 6:
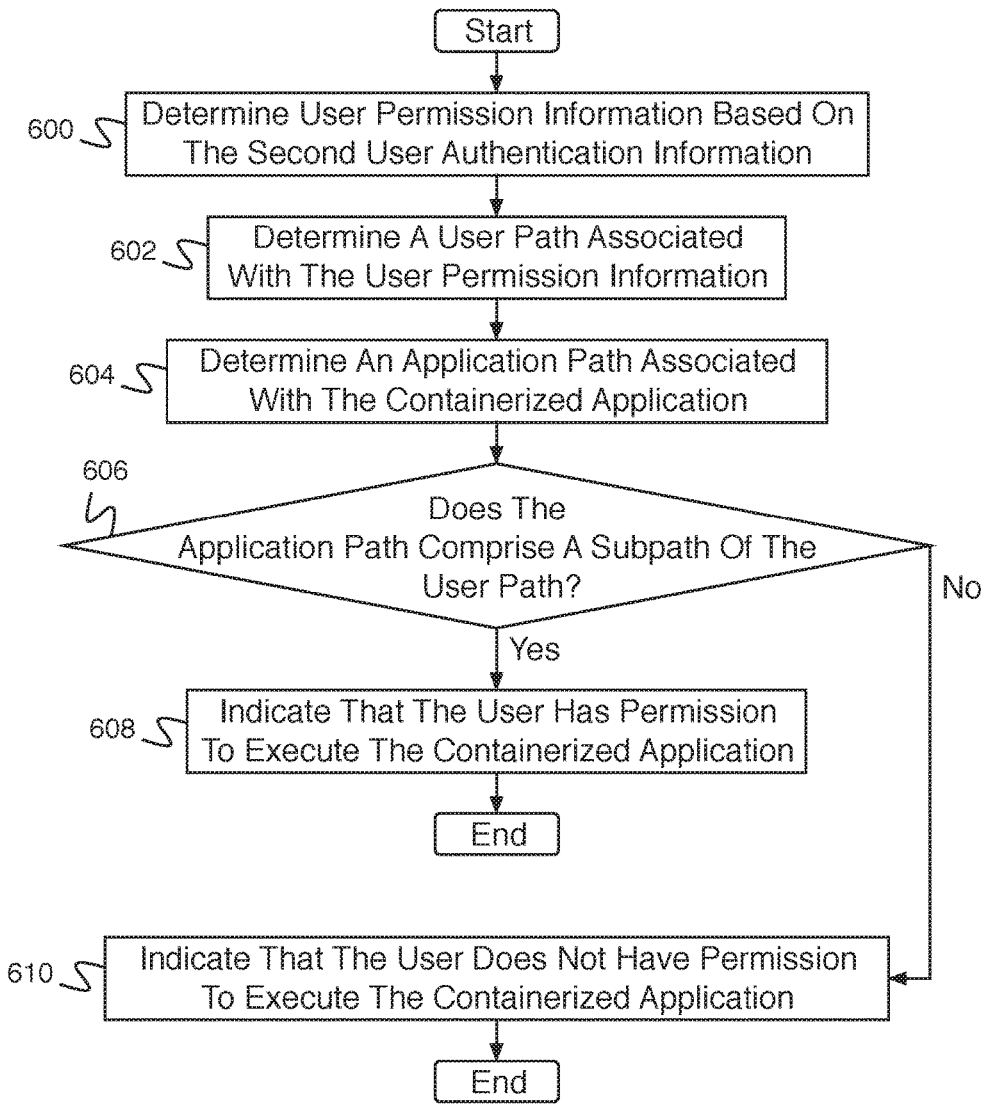
FIG. 6 is a flow diagram illustrating an embodiment of a process for determining whether second user authentication information indicates that a user has permission to execute a containerized application.

FIG. 6 is a flow diagram illustrating an embodiment of a process for determining whether second user authentication information indicates that a user has permission to execute a containerized application. In some embodiments, the process of FIG. 6 implements 408 of FIG. 4. In the example shown, in 600, user permission information based on the second user authentication information is determined. In some embodiments, the second user authentication information comprises an authentication token. In some embodiments, the authentication token comprises an authentication token issued by an authentication server (e.g., access manager 212 of FIG. 2). In some embodiments, an authentication token comprises a cryptographic authentication token. In some embodiments, determining user permission information based on the second user authentication information comprises querying an access manager (e.g., access manager 212 of FIG. 2). In 602, a user path associated with the user permission information is determined. In some embodiments, the user path comprises the user permission information. In some embodiments, the user path is determined based at least in part on the user permission information. In some embodiments, the user permission information comprises a second user directory path in which the user is allowed to execute a containerized application. In some embodiments, the second user directory path in which the user is allowed to execute a containerized application comprises a path distinct from a first user permission information comprising a first user directory path. In 604, an application path associated with the containerized application is determined. In some embodiments, the application path comprises the path in which the application is stored. In 606, it is determined whether the application path comprises a subpath of the user path. In some embodiments, a subpath comprises a subdirectory. In some embodiments, the application path is considered to be a subpath of the user path in the event that the application path and the user path comprise the same path. In the event it is determined that the application path comprises a subpath of the user path, control passes to 608. In 608, the process indicates that the user has permission to execute the containerized application, and the process ends. In the event it is determined in 606 that the application path does not comprise a subpath of the user path, control passes to 610. In 610, the process indicates that the user does not have permission to execute the containerized application.

Figure 7:
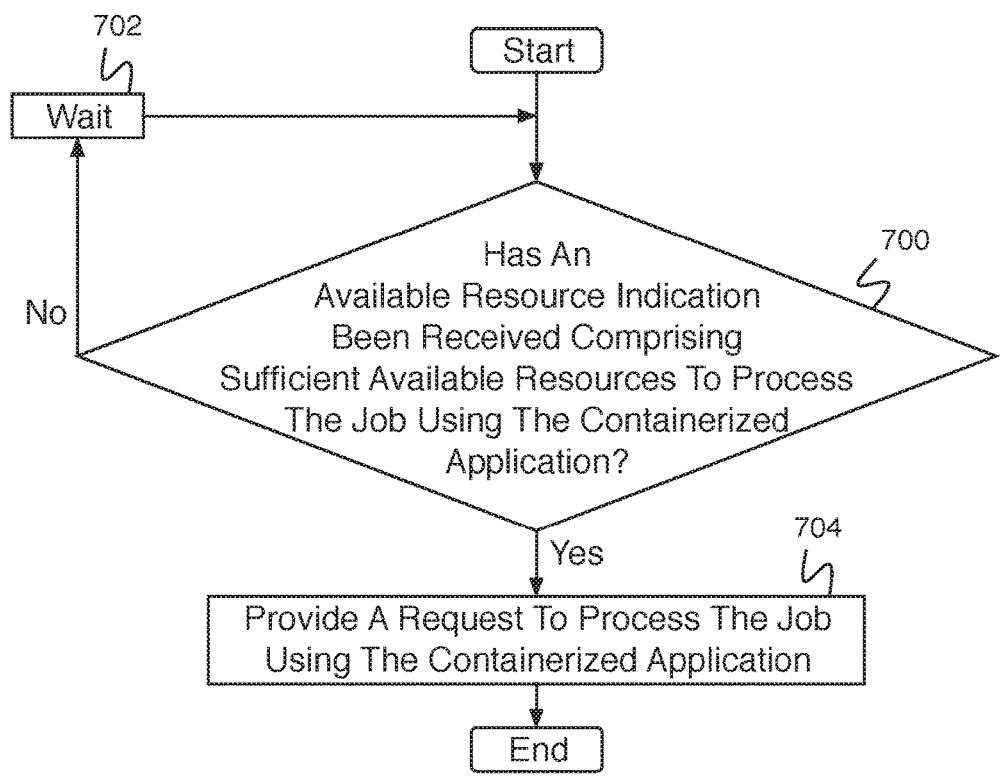
FIG. 7 is a flow diagram illustrating an embodiment of a process for indicating to process a job using a containerized application.

FIG. 7 is a flow diagram illustrating an embodiment of a process for indicating to process a job using a containerized application. In some embodiments, the process of FIG. 7 implements 410 of FIG. 4. In the example shown, in 700, it is determined whether an available resource indication has been received comprising sufficient available resources to process the job using the containerized application. For example, an available cluster resource sufficient for processing the job is indicated to be available, and the job is then processed using the available cluster resource to run the containerized application. In the event it is determined that an available resource indication has not been received comprising sufficient resources to process the job using the containerized application, control passes to 702. In 702, the process waits. Control the passes to 700. In the event it is determined in 700 that an available resource indication has been received comprising sufficient available resources to process the job using the containerized application, control passes to 704. In 704, a request is provided to process the job using the containerized application.

Figure 8:
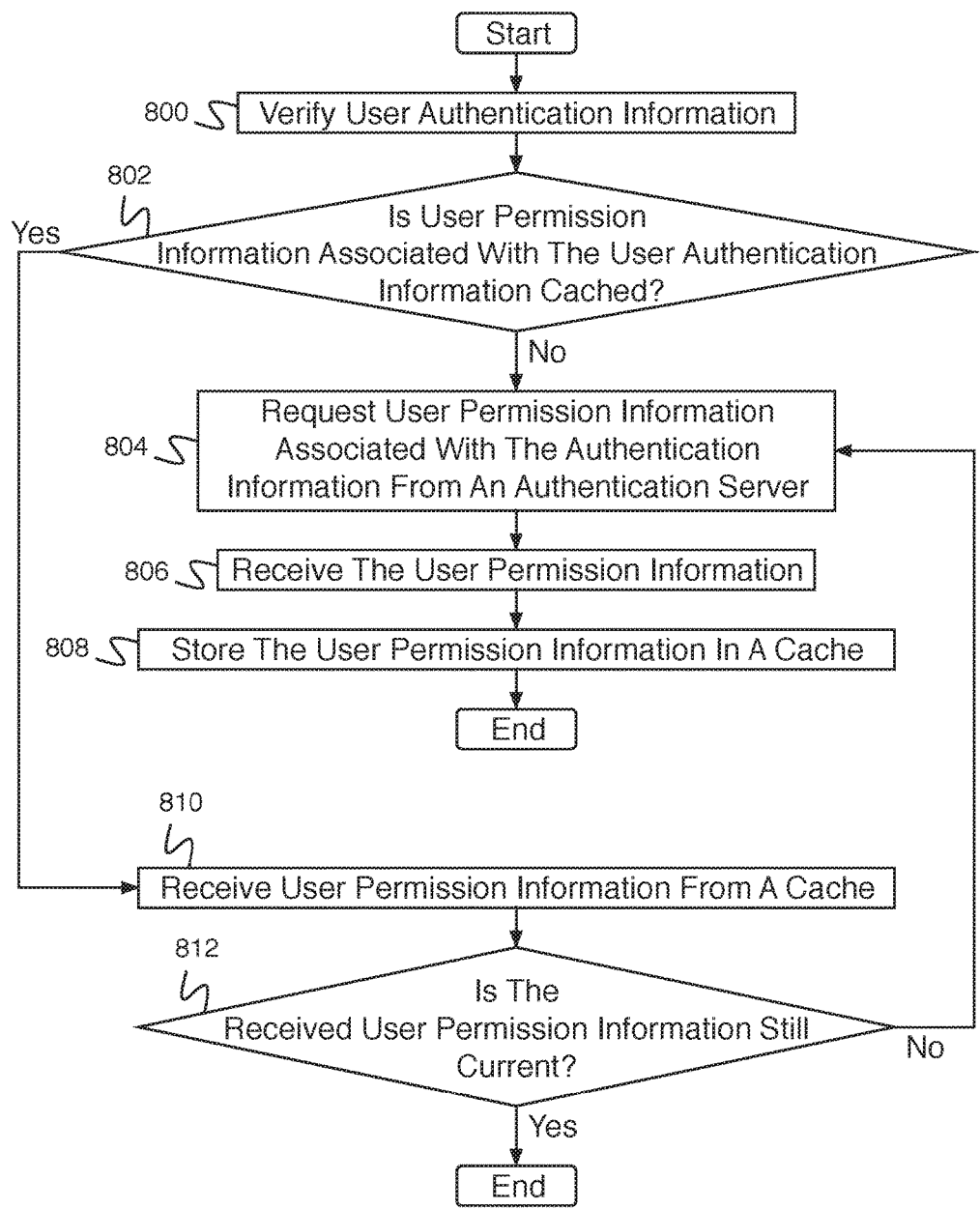
FIG. 8 is a flow diagram illustrating an embodiment of a process for determining user permission information based on authentication information.

FIG. 8 is a flow diagram illustrating an embodiment of a process for determining user permission information based on authentication information. In some embodiments, the process of FIG. 8 implements 600 of FIG. 6 or 500 of FIG. 5. In the example shown, in 800, user authentication information is verified. In some embodiments, verifying authentication information comprises validating the cryptographic signature of an authentication token. In some embodiments, in the event that the user authentication information cannot be verified, the process ends. In 802, it is determined whether user permission information associated with the user authentication information is cached (e.g., stored locally, in a cache). In some embodiments, determining whether user permission information associated with the user authentication information is cached comprises querying a local cache with user information determined from the user authentication information. In the event it is determined that the user permission information is cached, control passes to 810. In the event it is determined that the user permission information is not cached, control passes to 804. In 804, user permission information associated with the authentication information is requested from the authentication server. The authentication information is provided to the authentication server and user permission information is requested. In some embodiments, the request additionally comprises a user action type (e.g., create job, execute job, query job status, query job metadata, etc.). In some embodiments, the request additionally comprises a user role (e.g., a user job title, a user hierarchy level, a user group, a user team, a user organization, etc.). In some embodiments, user permission information is based at least in part on the role associated with the user. In 806, the user permission information is received. In 808, the user permission information is stored in a cache. In some embodiments, the user permission information is stored in a cache associated with a timestamp (e.g., indicating when the user permission information was acquired). The process then ends. In 810, user permission information is received from a cache. In 812, it is determined whether the received user permission information is still current. In some embodiments, determining whether the received user permission information is still current comprises comparing a timestamp associated with the received user permission information with a time threshold (e.g., 1 second ago, 10 seconds ago, 1 minute ago, 1 hour ago, etc.). In the event it is determined that the received user permission information is not still current, control passes to 804. For example, if user permission information is not current, then fresh user permission information is retrieved (e.g., to be used by comparing that against the application permission to determine whether a user is able to execute the application). In the event it is determined that the received user permission information is still current, the process ends.

Figure 9:
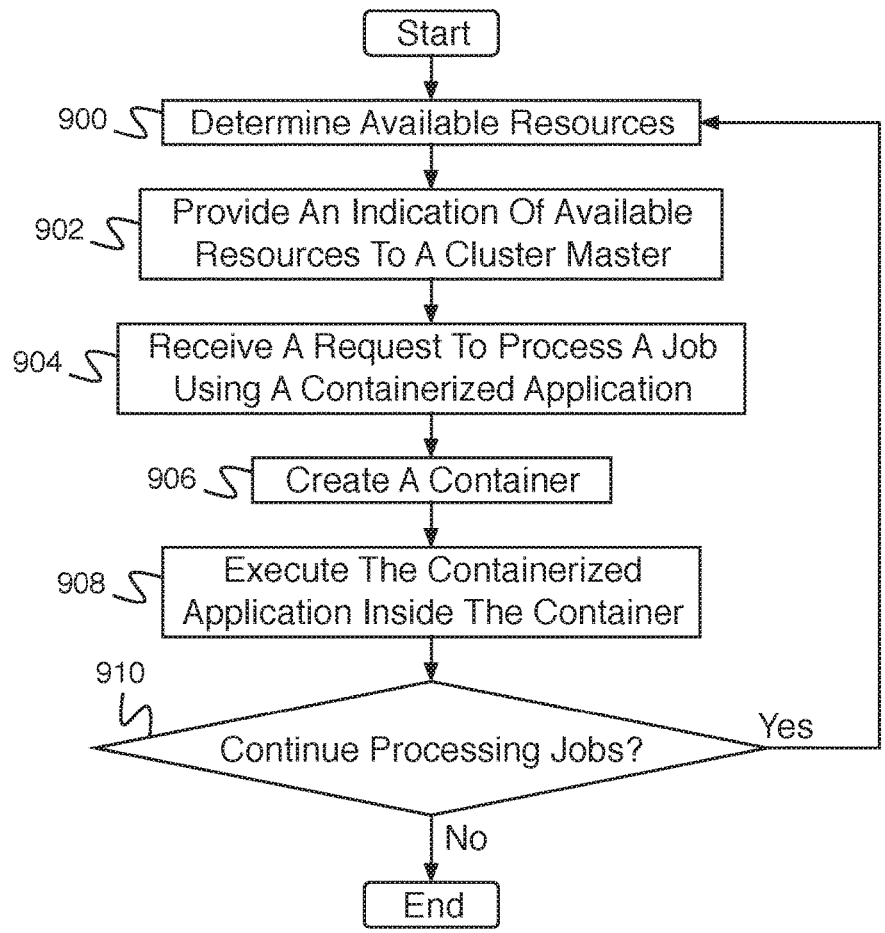
FIG. 9 is a flow diagram illustrating an embodiment of a process for processing a job.

FIG. 9 is a flow diagram illustrating an embodiment of a process for processing a job. In some embodiments, the process of FIG. 9 is executed by a worker node (e.g., worker node 214 of FIG. 2). In the example shown, in 900, available resources (e.g., local available resources on the worker node, e.g., processor capacity, memory, storage, bandwidth, etc.) are determined. In 902, an indication of available resources is provided to a cluster master. In 904, a request to process a job using a containerized application is received. In 906, a container is created. In 908, the containerized application is executed inside the container. In 910, it is determined whether to continue processing jobs. In the event it is determined to continue processing jobs, control passes to 900. In the event it is determined not to continue processing jobs, the process ends.

Figure 10:
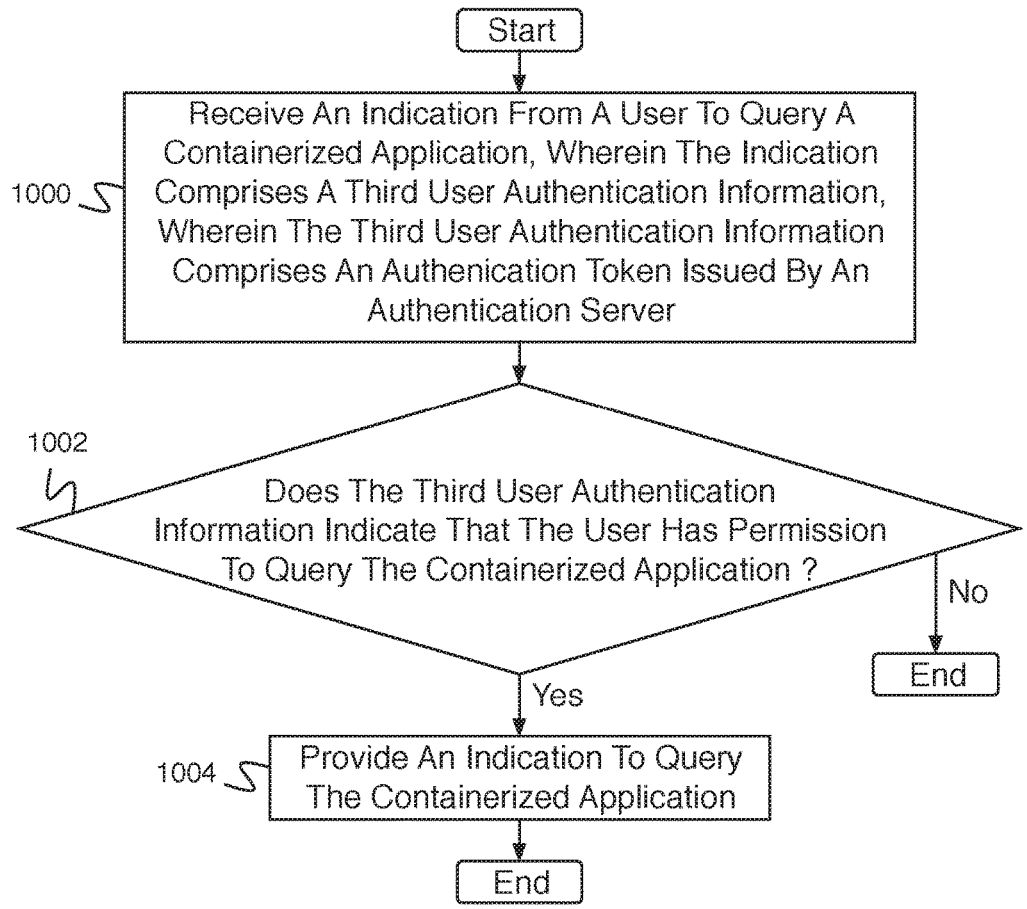
FIG. 10 is a flow diagram illustrating an embodiment of a process for querying a containerized application.

FIG. 10 is a flow diagram illustrating an embodiment of a process for querying a containerized application. In various embodiments, the process of FIG. 10 is executed by a worker node (e.g., worker node 214 of FIG. 2), by a cluster master (e.g., cluster master 210 of FIG. 2), a job launcher (e.g., job launcher 208 of FIG. 2), or any other appropriate unit. In the example shown, in 1000, an indication is received from a user to query a containerized application, wherein the indication comprises a third user authentication information, wherein the third user authentication information comprises an authentication token issued by an authentication server. In various embodiments, querying the containerized application comprises one or more of the following query types: determining application progress, determining application metadata, determining application logs, determining application metrics (e.g., running time, central processing unit (CPU) usage, cache misses, system calls, etc.), or any other appropriate query type. In some embodiments, application metadata includes the fact that the application exists (e.g., when a user lists all applications). In 1002, it is determined whether the third user authentication information indicates that the user has permission to query the containerized application. In some embodiments, determining whether the third user authentication information indicates that the user has permission to query the containerized application comprises determining a third user directory path in which the user is allowed to query the containerized application. In some embodiments, a third user directory path in which the user is allowed to query the containerized application is based at least in part on a query type. In the event it is determined that the user does not have permission to query the containerized application, the process ends. In the event it is determined that the user has permission to query the containerized application, control passes to 1004. In 1004, an indication is provided to query the containerized application. In some embodiments, the containerized application is queried.

Figure 11:
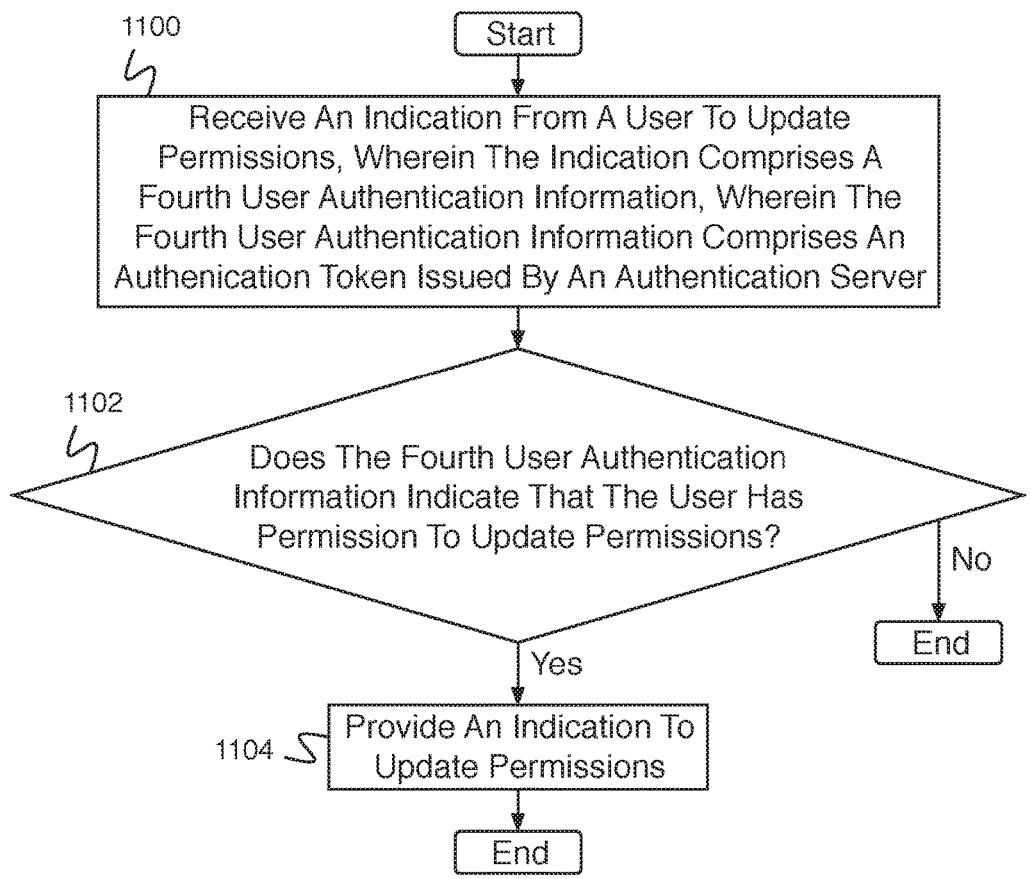
FIG. 11 is a flow diagram illustrating an embodiment of a process for updating permissions.

FIG. 11 is a flow diagram illustrating an embodiment of a process for updating permissions. In some embodiments, the process of FIG. 11 is executed by access manager 212 of FIG. 2. In the example shown, in 1100, an indication is received from a user to update permissions, wherein the indication comprises a fourth user authentication information, wherein the fourth user authentication information comprises an authentication token issued by an authentication server. In some embodiments, the user comprises an administrator. In 1102, it is determined whether the fourth user authentication information indicates that the user has permission to update permissions. In the event it is determined that the user does not have permission to update permissions, the process ends. In the event it is determined that the user has permission to update permissions, control passes to 1104. In 1104, an indication to update permissions is provided. In some embodiments, permissions are updated. Permissions comprise user permission information associated with authentication information and stored on the authentication server (e.g., user permission information provided in response to authentication information in 804 of FIG. 8). In some embodiments, using the process of FIG. 11, permissions can be updated for user access at any time, and take effect as soon as a cache time threshold is reached (e.g., as set by the administrator to 1 second, 1 minute, 1 hour, etc.).

In some embodiments, the process of FIG. 11 is used to determine whether a user (e.g., a fourth user) has permission to update a configuration associated with a containerized application and to indicate, if appropriate, to update the configuration associated with the containerized application. For example, the permission and/or access control is used for the processes of renaming, changing the folder path, changing resource requirements, changing the linux user to run as, changing the source binaries/images, etc. associated with the containerized application or any other appropriate action regarding the configuration of the containerized application or for indicating to update the configuration for the containerized application.

Figure 12:
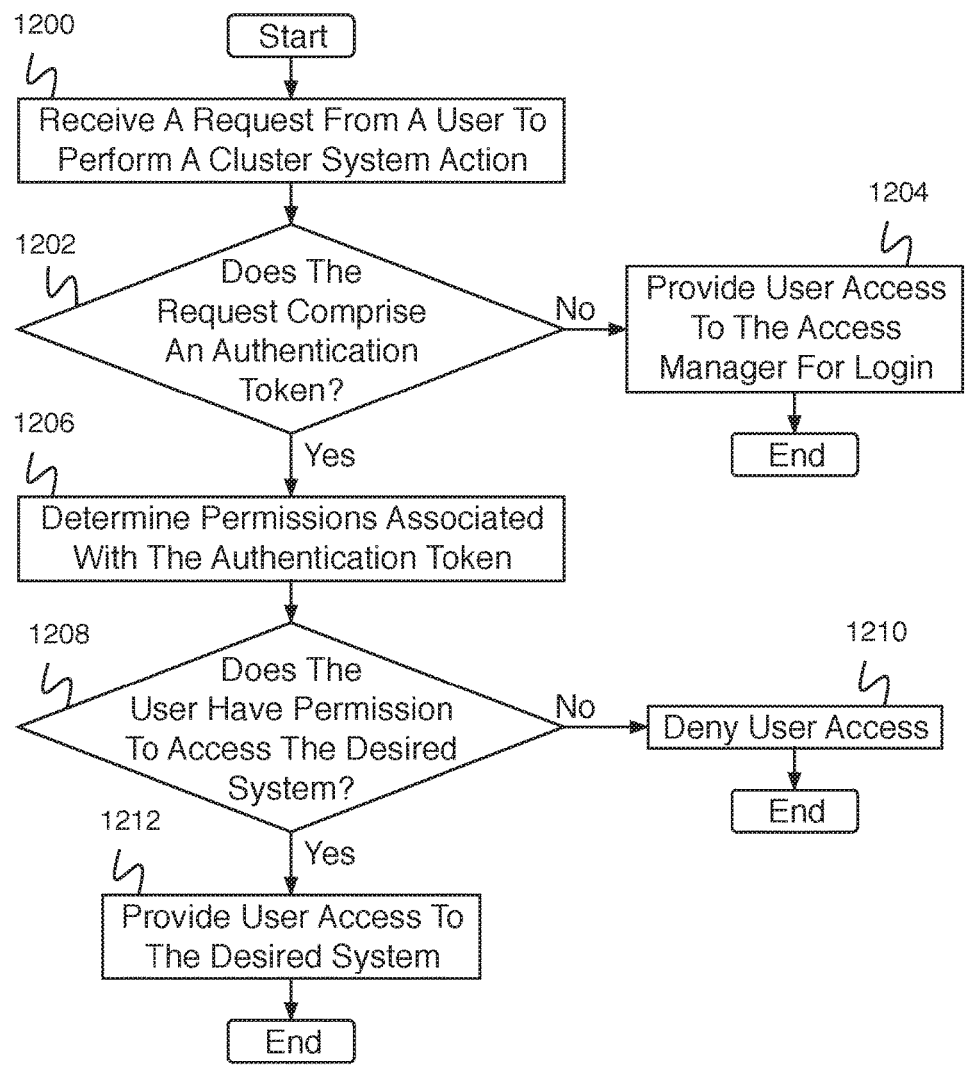
FIG. 12 is a flow diagram illustrating an embodiment of a process for authenticating and forwarding a request.

FIG. 12 is a flow diagram illustrating an embodiment of a process for authenticating and forwarding a request. In some embodiments, the process of FIG. 12 is executed by administration router 202 of FIG. 2. In the example shown, in 1200, a request is received from a user to perform a cluster system action. In 1202, it is determined whether the request comprises an authentication token. In the event the request does not comprise an authentication token, control passes to 1204. In 1204, user access is provided to the access manager for login (e.g., to execute a log in process and obtain an authentication token). The process then ends. In the event it is determined in 1202 that the request comprises an authentication token, control passes to 1206. In 1206, permissions associated with the authentication token are determined (e.g., by querying an access manager). In 1208, it is determined whether the user has permission to access the desired system (e.g., whether the permissions associated with the authentication token indicate that the user has permission to access the desired system). In the event it is determined that the user does not have permission to access the desired system, control passes to 1210. In 1210, user access is denied, and the process ends. In the event it is determined in 1208 that the user has permission to access the desired system, control passes to 1212. In 1212, user access to the desired system is provided. A user process is then executed at the desired system, for example, a process to create a job, a process to execute a job, a process to query a job, a process to change permissions, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a containerized application, comprising:
an interface configured to:
receive an indication of a request from a user to create a containerized application, wherein the indication comprises a first user authentication information and an application permission information for the containerized application, wherein the first user authentication information comprises an authentication token issued by an authentication server for the user request upon an initial user login into the system; and
a hardware processor configured to:
determine whether the first user authentication information indicates that the user has permission to create a definition for the containerized application with the application permission information; and
in the event that the first user authentication information indicates the user has permission to execute the containerized application with the application permission information, create the definition for the containerized application, which can be used to execute the containerized application in a container, with the application permission information;
determine whether a second user authentication information indicates that the user has permission to execute the containerized application using the definition for the containerized application, wherein determining whether the second user authentication information indicates that the user has permission to execute the containerized application is based at least in part on the application permission information associated with the containerized application; and
in the event the second user authentication information indicates that the user has permission to execute the containerized application using the definition for the containerized application, indicate to process a job by executing the containerized application in the container.

2. The system of claim 1, wherein the interface is further configured to:
receive a job indication to process a job using the containerized application, wherein the job indication comprises the second user authentication information.

3. The system of claim 1, wherein the first user authentication information and the second user authentication information comprise authentication tokens.

4. The system of claim 3, wherein authentication tokens comprise authentication tokens issued by an authentication server.

5. The system of claim 3, wherein authentication tokens comprise cryptographic authentication tokens.

6. The system of claim 3, wherein authentication tokens are issued by an authentication server in response to authentication information.

7. The system of claim 6, wherein authentication information comprises a username and password, single sign on information, LDAP information, or PKI information.

8. The system of claim 1, wherein determining whether the first user authentication information indicates that the user has permission to create the containerized application with the application permission information comprises:
querying an authentication server for first user permission information using the first user authentication information;
receiving first user permission information from the authentication server; and
comparing the first user permission information with the application permission information.

9. The system of claim 8, wherein determining whether the first user authentication information indicates that the user has permission to create the containerized application with the application permission information additionally comprises:
storing the first user permission information in a cache.

10. The system of claim 1, wherein determining whether the first user authentication information indicates that the user has permission to create the containerized application with the application permission information comprises:
receiving first user permission information from a cache;
determining whether the first user permission information is current; and
in the event the first user permission information is still current:
comparing the first user permission information with the application permission information.

11. The system of claim 10, wherein the first user permission information comprises a first user directory path in which the user is allowed to create the containerized application.

12. The system of claim 11, wherein a second user permission information comprising a second user directory path in which the user is allowed to execute the containerized application is distinct from the first user permission information comprising the first user directory path.

13. The system of claim 11, wherein comparing the first user permission information with the application permission information comprises determining whether an application directory path associated with the application permission information comprises a subpath of the first user directory path.

14. The system of claim 11, wherein the first user permission information is based at least in part on a role associated with the user.

15. The system of claim 1, wherein determining whether the second user authentication information indicates that the user has permission to execute the containerized application comprises:
querying an authentication server for second user permission information using the second user authentication information;
receiving second user permission information from the authentication server; and
comparing the second user permission information with the application permission information associated with the containerized application.

16. The system of claim 1, wherein indicating to process the job using the containerized application comprises:
determining whether an available resource indication has been received comprising sufficient available resources to process the job using the containerized application; and
in the event it is determined that an available resource indication has been received comprising sufficient available resources to process the job using the containerized application, providing a request to process the job using the containerized application.

17. The system of claim 1, wherein processing the job using the containerized application comprises:
creating a container; and
executing the containerized application in the container.

18. The system of claim 1, wherein the processor is further configured to:
determine whether third user authentication information indicates that the user has permission to query the containerized application; and
in the event it is determined that the third user authentication information indicates that the user has permission to query the containerized application:
provide a query indication to query the containerized application.

19. The system of claim 18, wherein querying the containerized application comprises one or more of the following query types: determining application progress, determining application metadata, determining application logs, or determining application metrics.

20. The system of claim 18, wherein a third user permission information comprising a third user directory path in which the user is allowed to query the containerized application is based at least in part on a query type.

21. The system of claim 1, wherein the processor is further configured to:
determine whether a fourth user authentication information indicates that the user has permission to update a configuration associated with the containerized application; and
in the event it is determined that the fourth user authentication information indicates that the user has permission to update permissions:
provide an indication to update the configuration associated with the containerized application.

22. The system of claim 1, wherein the processor is further configured to perform one or more of the following: viewing, accessing, creation, running, completing, reading, updating, or deleting of the containerized application or the definition of the containerized definition.

23. A method for a containerized application, comprising:
receiving an indication of a request from a user to create a containerized application, wherein the indication comprises a first user authentication information and an application permission information for the containerized application, wherein the first user authentication information comprises an authentication token issued by an authentication server for the user request upon an initial user login into the system;
determining, using a processor, whether the first user authentication information indicates that the user has permission to create a definition for the containerized application with the application permission information;
in the event that the first user authentication information indicates the user has permission to execute the containerized application with the application permission information, creating the definition for the containerized application, which can be used to execute the containerized application in a container, with the application permission information;
determining whether a second user authentication information indicates that the user has permission to execute the containerized application using the definition for the containerized application, wherein determining whether the second user authentication information indicates that the user has permission to execute the containerized application using the definition for the containerized application is based at least in part on the application permission information associated with the containerized application; and
in the event the second user authentication information indicates that the user has permission to execute the containerized application, indicating to process a job by executing the containerized application in the container.

24. A computer program product embodied in a non-transitory computer readable storage medium for a containerized application comprising computer instructions when executed to perform functions of:
receiving an indication of a request from a user to create a containerized application, wherein the indication comprises a first user authentication information and an application permission information for the containerized application, wherein the first user authentication information comprises an authentication token issued by an authentication server for the user request upon an initial user login into the system;
determining whether the first user authentication information indicates that the user has permission to create a definition for the containerized application with the application permission information;
in the event that the first user authentication information indicates the user has permission to execute the containerized application with the application permission information, creating the definition for the containerized application, which can be used to execute the containerized application in a container, with the application permission information;
determining whether a second user authentication information indicates that the user has permission to execute the containerized application using the definition for the containerized application, wherein determining whether the second user authentication information indicates that the user has permission to execute the containerized application using the definition for the containerized application is based at least in part on the application permission information associated with the containerized application; and
in the event the second user authentication information indicates that the user has permission to execute the containerized application, indicating to process a job by executing the containerized application in the container.

* * * * *